United States Patent Office 3,085,021
Patented Apr. 9, 1963

3,085,021
BONDING AGENT FOR DRY AIR
SETTING MORTARS
Howard E. Konrad, Somerville, N.J., assignor to Johns-Manville Corporation, New York, N.Y., a corporation of New York
No Drawing. Continuation of application Ser. No. 706,581, Jan. 2, 1958. This application Jan. 18, 1960, Ser. No. 2,801
13 Claims. (Cl. 106—84)

This invention relates to an improved bonding agent for dry air setting refractory cements or bonding mortars, and an improved method of uniting or joining refractory materials and enhancing strength and the like advantageous properties in bonding agents for dry air setting bonding mortars and cements.

This application is a continuation of my copending United States patent application Serial No. 706,581, filed January 2, 1958, now abandoned.

In some instances prefiring strength requirements render it desirable, or even necessary, that a refractory installation or structure be constructed or assembled with a dry air setting bonding mortar or cement in place of the more conventional heat setting mortars such as fire clay. Typical dry air setting bonding cements or mortars generally exhibit far greater bonding strength prior to firing than unfired heat setting cements or mortars; however, dry air setting materials frequently do not provide good or satisfactory uniform bonding strengths over the entire temperature range most operations call for, i.e. up to at least approximately 2500° F. Moreover, there is a need for dry air setting cements or mortars containing a bonding agent capable of remixing or reworking with water for periods of approximately 24 hours or greater as well as imparting satisfactory bonding strength through all temperature ranges. The prior art, however, is notably lacking of satisfactory bonding agents or dry air setting bonding mortars or cements which exhibit either good bonding characteristics throughout the usual operational temperature ranges or the capability of being remixed or reworked with water.

It is an object of this invention to provide an improved bonding agent for refractory cements or mortars which imparts adequate strength at all temperatures up to at least approximately 2500° F.

A further object of this invention is to provide a means or bonding agent which permits easy reworking or remixing of dry air setting refractory cement or mortar up to approximately 48 hours after the initial addition of water thereto.

A still further object of this invention is to provide a dry air setting bonding cement or mortar of high refractory characteristics and workability which has high bonding strength throughout all typical temperature ranges.

It is also an object of this invention to provide a method of increasing the strength of dry air refractory bonding mortar or cements at all temperatures up through 2500° F. and effecting reworking and remixing properties in such dry air refractory mortars or cements.

These and other objects and advantages will become apparent and more fully understood from a consideration of the following detailed description of the invention.

According to the present invention the foregoing as well as other objects and advantages will be achieved by means of a bonding agent which comprises a blend of aluminum sulphate and an alkali metal silicate comprising, for example, sodium and/or potassium silicate. The aluminum sulphate and alkali metal silicate refractory cement or mortar binder components of this invention are proportioned in a ratio of approximately 2–5 parts by weight on a dry basis of aluminum sulphate to 1–3 parts by weight on a dry basis of alkali metal silicate and comprise about 15–40% by weight of the cement or mortar. Dry air setting refractory cements or mortars contemplated by this invention may be prepared, for example, by mixing approximately 10.25% by weight, on a dry basis, of aluminum sulphate and approximately 5–15% by weight, on a dry basis, of alkali metal silicate with at least about 60% by weight of conventional refractory cement or mortar ingredients or aggregate such as refractory clay-like materials, alumina and/or silica, and the like.

The blended bonding agent of this invention may be combined with substantially any conventional type of inert refractory aggregate to prepare dry air setting refractory cements or mortars. For example, other than the components of the bonding agent the cement or mortar may comprise, among other ingredients, raw and/or calcined clays, fused alumina, sand or silica, fine stone, argillaceous materials and the like. It should be understood, of course, that the aggregate or similar components should be sufficiently refractory for the particular installation contemplated and that its particle size must be such that it will not interfere with conventional mortaring and/or laying of cast shapes such as brick or other techniques, procedures, construction or objects desired.

Dry air setting refractory bonding cements or mortars within the scope of the instant invention may be prepared simply by uniformly mixing or blending the aluminum sulphate and alkali metal silicate with clay or clay-like materials and/or other appropriate aggregate or components in the approximate proportions indicated above. The use of a dry alkali metal silicate is preferred in that dry particulate material, as well as the resulting cement or mortar, is more readily handleable and mixable, but solutions of any of the components may be utilized particularly since the liquid or wet cement or mortar of this invention may be reworked or remixed with water for periods up to at least about 48 hours after the initial wetting.

Clay, particularly Cooley clay, i.e., a ball clay, or one having the gelling characteristics of a montmorillonite or bentonite-type clay is a preferred, but not essential, component of the disclosed dry air setting refractory bonding cements or mortars. Ball or bentonite-type clays impart body and function as thickening or suspending aids whereby workability and homogeneity of the mix is substantially improved. Bentonite, however, is not sufficiently refractory or heat resistant for many applications whereas a ball clay such as Cooley clay possesses good plasticity as well as high refractory characteristics.

The following examples illustrate suitable dry air setting refractory bonding cement or mortar compositions in approximate percentages by weight based on dry ingredients. It is to be understood that the compositions of the cement or mortar are exemplary and are not to be construed to limit the invention to the particular clays or other components specified in the examples other than the novel aluminum sulphate and alkali metal silicate bonding agents.

*Example 1*

| | Percent |
|---|---|
| Calcined Pennsylvania fire clay | 30.5 |
| Kyanite | 30.5 |
| Cooley clay (a ball clay) | 10.0 |
| Dry aluminum sulphate | 20.0 |
| Dry sodium silicate | 9.0 |
| | 100.0 |

Example II

| | Percent |
|---|---|
| Calcined Pennsylvania fire clay | 31.0 |
| Kyanite | 31.0 |
| Cooley clay (a ball clay) | 11.0 |
| Dry aluminum sulphate | 20.0 |
| Liquid potassium silicate (comprising approximately ⅓ solid) | 7.0 |
| | 100.0 |

The foregoing dry air setting refractory bonding cement or mortar compositions exhibited adequate bonding strength characteristics and may be reworked for periods up to 48 hours.

It will be understood that the details given are for the purpose of illustration, not restriction, and that variations within the spirit of the invention are intended to be included in the scope of the appended claims.

What I claim is:

1. An improved bonding agent for refractory cements which consists essentially of the combination of approximately 2 to 5 parts by weight on a dry basis of aluminum sulphate and approximately 1 to 3 parts by weight on a dry basis of an alkali metal silicate selected from the group consisting of sodium silicate and potassium silicate and mixtures thereof.

2. An improved bonding agent for dry air setting refractory bonding mortar and cement which consists essentially of the combination of approximately 2 to 5 parts by weight on a dry basis of aluminum sulphate and approximately 1 to 3 parts by weight on a dry basis of an alkali metal silicate selected from the group consisting of sodium silicate and potassium silicate and mixtures thereof.

3. An improved dry air setting refractory bonding mortar and cement containing approximately 10 to 40% by weight of a bonding agent which consists essentially of the combination of approximately 2 to 5 parts by weight on a dry basis of aluminum sulphate and approximately 1 to 3 parts by weight on a dry basis of an alkali metal silicate selected from the group consisting of sodium silicate and potassium silicate and mixtures thereof.

4. An improved dry air setting refractory bonding mortar and cement which consists essentially of at least approximately 60% by weight of clay and approximately 10 to 25% by weight on a dry basis of aluminum sulphate and approximately 5 to 15% by weight on a dry basis of an alkali metal silicate selected from the group consisting of sodium silicate and potassium silicate and mixtures thereof.

5. An improved dry air setting refractory bonding mortar and cement which comprises at least approximately 60% by weight of a ball clay and approximately 15 to 40% by weight of a bonding agent consisting essentially of approximately 2 to 5 parts by weight on a dry basis of aluminum sulphate and approximately 1 to 3 parts by weight on a dry basis of an alkali metal silicate selected from the group consisting of sodium silicate and potassium silicate and mixtures thereof.

6. An improved dry air setting refractory bonding mortar and cement which comprises at least approximately 60% by weight of a clay having the gelling characteristics of montmorillonite and approximately 15 to 40% by weight of a bonding agent consisting essentially of approximately 2 to 5 parts by weight on a dry basis of aluminum sulphate and approximately 1 to 3 parts by weight on a dry basis of an alkali metal silicate selected from the group consisting of sodium silicate and potassium silicate and mixtures thereof.

7. An improved method of uniting refractory components which consists of joining and bonding said refractory components by applying thereto a dry air setting refractory cement the bonding agent of which consists essentially of the combination of approximately 2 to 5 parts by weight on a dry basis of aluminum sulphate and approximately 1 to 3 parts by weight on a dry basis of an alkali metal silicate selected from the group consisting of sodium silicate and potassium silicate and mixtures thereof.

8. An improved method of mortaring refractory bricks which consists of joining and bonding bricks by applying thereto a dry air setting refractory mortar and cement the bonding agent of which consists essentially of the combination of approximately 2 to 5 parts by weight on a dry basis of aluminum sulphate and approximately 1 to 3 parts by weight on a dry basis of an alkali metal silicate selected from the group consisting of sodium silicate and potassium silicate and mixtures thereof.

9. A method of increasing strength and effecting reworking and remixing characteristics in dry air setting refractory bonding mortar and cement which comprises incorporating therein approximately 10 to 40% by weight of a bonding agent which consists essentially of the combination of approximately 2 to 5 parts by weight on a dry basis of aluminum sulphate and approximately 1 to 3 parts by weight on a dry basis of an alkali metal silicate selected from the group consisting of sodium silicate and potassium silicate and mixtures thereof.

10. The method of producing dry air setting refractory bonding mortar and cement which have increased strength at all temperatures from ambient up through approximately 2500° F. and are reworkable and remixable with water for about 24 to 48 hours subsequent to initial wetting, said method comprising preparing dry air setting refractory bonding mortar and cement by mixing at least approximately 60% by weight of inert refractory aggregate with approximately 10 to 40% by weight of a binder consisting essentially of the combination of approximately 2 to 5 parts by weight on a dry basis of aluminum sulphate and approximately 1 to 3 parts by weight on a dry basis of an alkali metal silicate selected from the group consisting of sodium and potassium silicate and mixtures thereof.

11. The method of producing dry air setting refractory bonding mortar and cement which have increased strength at all temperatures from ambient up through approximately 2500° F. and are reworkable and remixable with water for about 24 to 48 hours subsequent to initial wetting, said method comprising mixing at least approximately 60% by weight of clay with approximately 10 to 40% by weight of a bonding agent which consists essentially of the combination of approximately 2 to 5 parts by weight on a dry basis of aluminum sulphate and approximately 1 to 3 parts by weight on a dry basis of an alkali metal silicate selected from the group consisting of sodium silicate and potassium silicate and mixtures thereof.

12. An improved dry air setting refractory bonding mortar and cement consisting essentially of the following constituents in the approximate percentages by weight of:

| | Percent |
|---|---|
| Clay | 71 |
| Dry aluminum sulfate | 20 |
| Dry sodium silicate | 9 |

13. An improved dry air setting refractory bonding mortar and cement consisting essentially of the following constituents in the approximate percentages by weight of:

| | Percent |
|---|---|
| Calcined fire clay | 30.5 |
| Kyanite | 30.5 |
| Ball clay | 10.0 |
| Dry aluminum sulfate | 20.0 |
| Dry sodium silicate | 9.0 |

(References on following page)

References Cited in the file of this patent

UNITED STATES PATENTS

| | | |
|---|---|---|
| 1,576,550 | Rochow | Mar. 16, 1926 |
| 1,900,212 | Watson | Mar. 7, 1933 |
| 2,188,311 | Reimers | Jan. 30, 1940 |
| 2,204,913 | Ruddle | June 18, 1940 |
| 2,318,753 | Carter | May 11, 1943 |
| 2,400,087 | Harth | May 14, 1946 |
| 2,423,231 | Esnault-Pelterie | July 1, 1947 |
| 2,425,151 | Greger | Aug. 5, 1947 |
| 2,506,446 | Dubilier | May 2, 1950 |
| 2,603,570 | Bole | July 15, 1952 |
| 2,877,125 | Duplin | Mar. 10, 1959 |
| 2,883,723 | Moore et al. | Apr. 28, 1959 |
| 2,886,466 | Iler | May 12, 1959 |

OTHER REFERENCES

Ser. No. 436,541, Passelecq (A.P.C.), published May 11, 1943.

Alfred B. Searle, Refractory Material: Their Manufacture and Use, Griffin & Co., Ltd., London, 1924, page 342.

UNITED STATES PATENT OFFICE
CERTIFICATE OF CORRECTION

Patent No. 3,085,021                              April 9, 1963

Howard E. Konrad

It is hereby certified that error appears in the above numbered patent requiring correction and that the said Letters Patent should read as corrected below.

Column 2, line 6, for "10.25%" read -- 10-25% --.

Signed and sealed this 29th day of October 1963.

SEAL)
ttest:

RNEST W. SWIDER                          EDWIN L. REYNOLDS ttesting Officer                        Acting Commissioner of Patents